United States Patent [19]

Case et al.

[11] Patent Number: 4,555,767

[45] Date of Patent: Nov. 26, 1985

[54] METHOD AND APPARATUS FOR MEASURING THICKNESS OF EPITAXIAL LAYER BY INFRARED REFLECTANCE

[75] Inventors: William R. Case, Walden, N.Y.; Wildey E. Johnson, Boca Raton, Fla.

[73] Assignee: International Business Machines Corporation, Armonk, N.Y.

[21] Appl. No.: 442,193

[22] PCT Filed: May 27, 1982

[86] PCT No.: PCT/US82/00729

§ 371 Date: Oct. 28, 1982

§ 102(e) Date: Oct. 28, 1982

[51] Int. Cl.$^4$ ............................................. G01B 11/02
[52] U.S. Cl. .................................... 364/563; 356/357; 356/381
[58] Field of Search ................ 364/563, 728; 356/355, 356/357, 381, 382; 156/601; 148/175

[56] References Cited

U.S. PATENT DOCUMENTS

| | | | |
|---|---|---|---|
| 3,816,722 | 6/1974 | Sakoe et al. | 364/728 |
| 3,819,274 | 6/1974 | Koulicovitch et al. | 356/357 |
| 3,892,490 | 7/1975 | Uetsuki et al. | 356/382 X |
| 3,994,599 | 11/1976 | Southwell | 356/357 |
| 4,032,885 | 6/1977 | Roth | 364/728 |
| 4,203,799 | 5/1980 | Sugawara et al. | 356/357 X |
| 4,293,224 | 10/1981 | Gaston et al. | 356/357 |
| 4,355,903 | 10/1982 | Sandercock | 356/382 |

OTHER PUBLICATIONS

IBM Technical Disclosure Bulletin, Jun. 1981 (vol. 24, No. 1A), W. R. Case; "Transparent Film Thickness Measurement", pp. 49–54.
IBM Technical Disclosure Bulletin, Jun. 1982 (vol. 25, No. 1), G. H. Hewig; "In-Situ, Realtime Thin-Film Refractive Index & Thickness Monitor", pp. 436–438.
IBM Technical Disclosure Bulletin, Aug. 1976 (vol. 19, No. 3), R. B. Ananthakrishan, "Cubic Spline Fit for Calibration of Thin Film Measurement Tools", pp. 890–896.
Applied Optics, Sep. 1978 (vol. 17, No. 17), A. M. Goodman; "Optical Interference Method for Approximate Determination of Refractive Index and Thickness of a Transparent Layer", pp. 2779–2787.
IBM Technical Disclosure Bulletin, Apr. 1976 (vol. 18, No. 11), R. B. Ananthakrishnan; "Algorithm for Computing Thin-Film Thicknesses", pp. 3618–3819.
J. Electrochem. Soc., Feb. 1973 (vol. 120, No. 2), P. F. Cox et al.; "Measurement of Si Epitaxial Thickness Using a Michelson Interferometer", pp. 287–292.
J. App. Phy., Jul. 1970 (vol. 41, No. 8), P. A. Schumann et al., "Measurement of Silicon Epitaxial Layers Less than $1\mu$ Thick by Infrared Interference", pp. 3532–3535.
"Optical Properties of Thin Solid Films"; O. S. Heavens, Phd, published by Butterworths Scientific Publications, 1955, pp. 76 and 77.

Primary Examiner—Errol A. Krass
Assistant Examiner—Kevin J. Teska
Attorney, Agent, or Firm—Douglas R. McKechnie

[57] ABSTRACT

Method and apparatus measure the thickness of an epi layer grown on a substrate. IR energy 12 is directed onto the epi layer 13 and a portion 14 of the energy is reflected from the surface of the epi layer and from the interface of the epi layer and substrate. The spectral reflectance of the reflected energy is measured by means of a Fourier transform IR spectrometer 10. The measured values of spectral reflectance are correlated with a series of theoretical reflectance values determined for different thicknesses of an epi layer in a range including the nominal thickness. The measured or actual epi thickness is determined from the correlation analysis.

14 Claims, 7 Drawing Figures

METHOD AND APPARATUS FOR MEASURING THICKNESS OF EPITAXIAL LAYER BY INFRARED REFLECTANCE

FIELD OF THE INVENTION

This invention relates to improvements in method and apparatus for measuring or determining the thickness of an epitaxial (epi) layer on a semiconductor wafer by use of an infrared (IR) reflectance technique.

BACKGROUND OF THE INVENTION

As is well known, it is important in the fabrication of semi-conductor devices to know the thickness of an epi layer on a semi-conductor wafer. Different methods are known within the prior art for measuring or determining the epi thickness including methods based upon IR interference physical optic theory. In accordance with such theory, IR energy is directed onto a wafer and is reflected from the surface of the epi layer and from the interface between the epi layer and underlying substrate. The IR energy is directed as an incident beam onto a small area of the wafer at a position where the epi thickness is to be measured. Such incident beam is divided to form two reflected beams. One beam is reflected from the surface of the epi layer and the other beam is reflected from the epi layer/substrate interface. The two reflected beams interface with each other in such a manner that the epi thickness can be determined by spectral reflectance and interferometric methods.

The spectral reflectance method is based on the phenomena that the degree of optical interference between the two reflected beams cyclically varies at each wavelength across a spectrum. The variation produces a series of maxima and minima reflectance values in accordance with the degree of constructive and destructive interference at the different wavelengths. Such method generally involves measuring the spectral reflectance and then calculating the thickness using the reflectance at two different maxima or minima. An example of this method is standard test method F95 of the American Society for Testing Materials (ASTM) for "Thickness of Epitaxial Layers of Silicon on Substrates of the Same Type by Infrared Reflectance".

In the interferometric method, an interferometer is used to generate an interferogram from the two reflected beams. The interferogram includes a center burst or peak and two side bursts or peaks created as a result of displacement of the interferometer mirror. In a perfect system, the interferometer would be symetrical and the degree of mirror displacement between two positions corresponding to two of the bursts or peaks, is proportional to the epi thickness. In actual practice however, the interferogram is asymmetrical and a double Fourier Transform and other mathematical manipulations are performed to create an idealized interferogram, from which the thickness is calculated as a function of mirror displacement between the side peaks. An example of this method is described in "Measurement of Si Epitaxial Thickness Using a Michaelson Interferometer", Paul F. Cox and Arnold F. Stalder, *J. Elec. Soc.: Solid State Science and Technology*, February 1973, pgs. 287-292.

A current trend in the semi-conductor industry is to grow thinner and thinner epi layers having thicknesses less than one-half a micron. Thus there has developed the need to measure the thicknesses of such thin layers. But the methods and apparatuses of the prior art, particularily commercially available instruments, appear to be limited to making accurate measurements only for thicknesses substantially above 0.5 microns. In the spectral reflectance method, the number of extrema decrease with a decrease in epi thickness and it becomes difficult or impossible to average a number of calculations per the ASTM method, or even to recognize the extrema. In the interferometric method, the side peaks interfere with the center peak below three microns and with each other at thinner thicknesses, so that the mirror displacement cannot be accurately determined.

Additionally, prior art theory appears to be based on a number of simplifying assumptions about some of the optical factors or conditions, which assumptions are not exactly true and which tend to produce inaccurate results when applied to the measurement of extremely thin epi layers. Examples of such assumptions are that the index of refraction is constant, that there is no phase shift at the epi layer/substrate interface, and that the substrate is non-absorbant.

SUMMARY OF THE INVENTION

One of the objects of the invention is to provide an improved method and apparatus for rapidly and accurately measuring the thickness of an epi layer within a range the lower limit of which is less than 0.1 micron.

Another object is to determine the epi thickness from spectral reflectance data, in an improved manner.

Still another object is to measure epi thickness in accordance with physical optic theory without having to calibrate any apparatus or method.

Briefly, in accordance with the invention, a wafer having an epi layer grown on a substrate to a nominal thickness, is irradiated with IR energy and the spectral reflectance is measured. The measured values are correlated with a series of theoretical values determined for different thicknesses of an epi layer in a range including the nominal thickness. The actual epi thickness is determined from the correlation analysis. The theoretical values are based on the assumption of solid thin film theory that the epi layer constitutes a single absorbing layer on an absorbing substrate, and that the index of refraction and absorption coefficients vary.

Other objects and advantages of the invention will be apparent from the following description of a preferred embodiment taken in connection with the accompanying drawings wherein:

FIG. 1 is a block diagram of apparatus embodying the invention;

DETAILED DESCRIPTION

In general, the apparatus shown in FIG. 1 comprises a known, commercially available Fourier transform infrared (FTIR) spectrometer 10, such as one of the models of the IR80 or 90 series of FTIR spectrometers marketed by IBM Instruments Inc., modified (1) by using a reflectance accessory 11 to direct incident IR energy 12 onto a semiconductor wafer 13 and collect IR energy 14 reflected from the wafer, and (2) by the addition of novel programs stored in a data processing system (DPS) 15 for controlling operation of the spectrometer to measure or determine the thickness of an epi layer grown on the substrate of a wafer. Since most of the apparatus seen in FIG. 1 is old and well known, only a general description thereof is necessary in order to understand the invention.

An IR source 16 produces a beam of IR energy in the mid-IR region in which the epi layer is transparent. The beam from source 16 is directed into an interferometer 17 which includes a conventional beam splitter and movable mirror (not shown). These components function to split the beam into two beams and later re-combine the two beams with a degree of interference dependent upon the difference in optical path lengths of the two split beams. The degree of optical path length difference is controlled by the displacement of the movable mirror. Energy from beam 17 is directed to the reflectance accessory 11 in the form of a prism that reflects or produces an incident beam 12 directed towards wafer 13 at an angle of incidence of less than 30°. In a manner known in the art, the epi layer on wafer 13 is transparent to the passage of IR energy while the epi layer/substrate interface reflects such energy. A portion of the incident energy is absorbed by the wafer. Thus a portion of the energy from beam 12 is reflected as beam 14 which is then directed by the prism into an IR detector 18. This detector produces an electrical output proportional to the intensity of the IR energy received thereby which output represents the intensity as a function of the path displacement of the mirror. Such output plotted as a graph is known as an "interferogram". The output of detector 18 is fed to a sample and hold (S and H) circuit 19 the output of which is fed into an analog-to-digital converter (ADC) 20. In turn, the output of ADC 20 is fed into and stored within the DPS 15.

Means are provided for controlling S and H 19 to digitize the output of detector 18 at a predetermined sampling rate during a scan. Such means includes a white light source 22 that directs white light (polychromatic) through an interferometer 23 and into a detector 24. Interferometer 23 contains a movable mirror (not shown) linked to the movement of the mirror of interferometer 17. In operation, the output of detector 24 produces a center burst that is detected by a peak detector 25 to actuate a trigger 26 to start sampling the IR or measuring beam. A laser source 30 directs a monochromatic beam through an interferometer 31 whose mirror (not shown) is also linked with the motion of the other mirrors, and into a detector 32 whose output is a cosinusoidal function of the mirror displacement. All mirrors are moved at a constant velocity and the output of the detector 32 is fed through gate 33 so that when trigger 26 has been actuated, gate 33 is opened to pass signals from detector 32 into a Schmidt trigger 36. This component functions to square the wave form from detector 32. The output of trigger 36 is fed to a counter 37 whose output in turn is inputted into a programmable divider 38. A cable 39 connected to DPS 15 delivers a control signal to set divider 38 to control the sampling rate as a function of the number of laser signal cycles. Such number is proportional to the mirror displacement of interferometer 31 between successive samples. Because the two interferometer mirrors are moved together, the signal representing the intensity of IR energy received by detector 18 is digitized to create a series of digital values stored in DPS 15 as a function of mirror displacement. Known programs stored in DPS 15 perform various mathematical functions, including a discrete Fourier transform, to convert such signals into digital values in the frequency domain. Such values are the "spectral intensity", ie, intensity as a function of wavelength.

"Spectral reflectance" is the ratio of the reflected intensity to the incident intensity at each of the wavelengths across a spectral band. To determine the incident intensity a platinum mirror is substituted in spectrometer 10 for wafer 13. Such mirror has the property of non-absorbtion of IR energy. The intensity of the light reflected from the platinum mirror is the incident intensity which is detected, digitized and stored. Spectral reflectance of the wafer is then calculated by dividing the intensity of light reflected from the wafer by the intensity of light reflected from the platinum mirror, at each of the wavelengths.

DPS 15 includes a data library in which data measured at different times can be stored and used in later calculations and manipulations. Normally, the platinum mirror would be used once a day to measure the "incident intensity", while many measurements of reflected intensities from different wafers could be made and spectral reflectances thereof calculated using the single measurement of "incident intensity".

All of the foregoing apparatus and operations are the same as or similar to those of the prior art. In summary, they perform step 40 (FIG. 2) of the process of the invention. The novel portions of the invention are best understood from the remaining steps of the method of the invention described below relative to FIG. 2.

Figure 2:
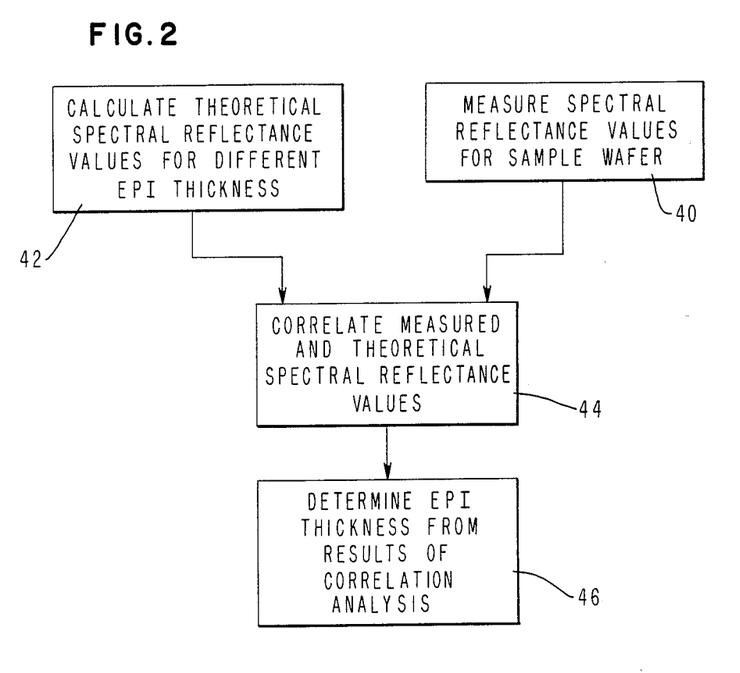
FIG. 2 is a flow diagram of the method of the invention.

Step 42 involves calculating the theoretical spectral reflectance values for different epi thicknesses at least over a range inclusive of the thickness being measured and dependent upon the doping concentrations of the epi layer and substrate. The calculations are based upon principles of classical physical optics and are derived from two different theories previously published.

The first theory is described in detail in Optical Properties Of Thin Solid Films, by O. S. Heavens, Butterworths (1955) pages 76-77. In accordance with this theory, which deals with the optical properties of a single absorbing layer on an absorbing substrate, the reflectance $R_1$ at a given wavelength and for a normal angle of incidence, is as follows:

$$R_1 = \frac{(g_1^2 + h_1^2)e^{2a_1} + (g_2^2 + h_2^2)e^{-2a_1} + A\cos 2\gamma_1 + B\sin 2\gamma_1}{e^{2a_1} + (g_1^2 + h_1^2)(g_2^2 + h_2^2)e^{-2a_1} + C\cos 2\gamma_1 + D\sin 2\gamma_1} \quad \text{(eqn. 1)}$$

$$A = 2(g_1 g_2 + h_1 h_2) \quad \text{(eqn. 2)}$$

$$C = 2(g_1 g_2 - h_1 h_2) \quad \text{(eqn. 3)}$$

$$B = 2(g_1 h_2 - g_2 h_1) \quad \text{(eqn. 4)}$$

$$D = 2(g_1 h_2 + g_2 h_1) \quad \text{(eqn. 5)}$$

$$g_1 = \frac{n_0^2 - n_1^2 - k_1^2}{(n_0 + n_1)^2 + k_1^2} \quad \text{(eqn. 6)}$$

$$g_2 = \frac{n_1^2 - n_2^2 + k_1^2 - k_2^2}{(n_1 + n_2)^2 + (k_1 + k_2)^2} \quad \text{(eqn. 7)}$$

$$h_1 = \frac{2n_0 k_1}{(n_0 + n_1)^2 + k_1^2} \quad \text{(eqn. 8)}$$

$$h_2 = \frac{2(n_1 k_2 - n_2 k_1)}{(n_1 + n_2)^2 + (k_1 + k_2)^2} \quad \text{(eqn. 9)}$$

$$a_1 = \frac{2\pi k_1 d_1}{\lambda} \quad \text{(eqn. 10)}$$

$$\gamma_1 = \frac{2\pi n_1 d_1}{\lambda} \quad \text{(eqn. 11)}$$

where $n_1$ and $n_2$ are the indices of refraction of the epi layer and the substrate, respectively, $n_0$ is the index of refraction of air, $k_1$ and $k_2$ are the coefficients of absorption of the epi layer and the substrate respectively and $d_1$ is the thickness of the epi layer.

Figure 3:
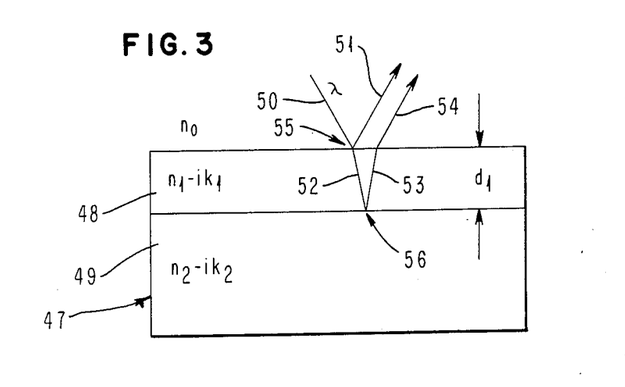
FIG. 3 is a diagrammatic illustration useful in understanding the invention.

Referring to FIG. 3, a wafer 47 comprises an epi layer 48 grown on a substrate 49 each of which is characterized by a different doping concentration. When an incident ray 50 of a given wavelength is directed onto the wafer, a first portion 51 is reflected from the upper surface of epi layer 48. Another portion for ray 52 is refracted downwardly through layer 48 and is reflected from the interface, at point 56, between the epi layer and substrate, to form a ray 53 which passes upwardly through the epi layer and exits or forms a ray 54. Rays 51 and 54 interfere with one another in accordance with classical interference theory to a degree dependent in part upon the phase shifts that occurs at points 55 and 56.

This published theory dealt generally with the situation of any absorbing layer on an absorbing substrate and we have found that such general theory is applicable to the measurement to the thickness of an epi layer. The values of $n_1$, $n_2$, $k_1$ and $k_2$ are dependent upon the doping concentration of the epi layer and substrate and so in order to accurately calculate reflectance by the above formulas, further calculations are done in accordance with a second theory published in the article "Measurement of Silicon Epitaxial Layers Less Than 1 Microbe Thick by Infrared Interference", by P. A. Schumann, Jr., and C. P. Schneider, Journal of Applied Physics, Volume 41, Number 8, July 1970, pages 3532–3535. This article contains formulae for calculating $n_2$ and $k_2$ and the same formulae can be used for calculating the $n_1$ and $k_1$ associated with the epi layer. Such values are calculated as follows:

$$n = \frac{1}{\sqrt{2}} \left( K_L - \frac{e^2 \lambda^2 NJ(D)}{4\pi^2 \epsilon_0 C^2 m^*} \right)^{\frac{1}{2}} \text{times} \quad \text{(eqn. 12)}$$

$$\left[ 1 \pm \left( 1 + \frac{e^8 \lambda^6 N^4 \rho_0^2 g^2 [L(D)]^2}{64\pi^6 \epsilon_0^2 C^6 m^{*4}(K_L - [e^2\lambda^2 NJ(D)/4\pi^2\epsilon_0 C^2 m^*])^2} \right)^{\frac{1}{2}} \right]^{\frac{1}{2}}$$

$$k = \frac{1}{\sqrt{2}} \left( K_L - \frac{e^2 \lambda^2 NJ(D)}{4\pi^2 \epsilon_0 C^2 m^*} \right)^{\frac{1}{2}} \text{times} \quad \text{(eqn. 13)}$$

$$\left[ -1 \pm \left( 1 + \frac{e^8 \lambda^6 N^4 \rho_0^2 g^2 [L(D)]^2}{64\pi^6 \epsilon_0^2 C^6 m^{*4}(K_L - [e^2\lambda^2 NJ(D)/4\pi^2\epsilon_0 C^2 m^*])^2} \right)^{\frac{1}{2}} \right]^{\frac{1}{2}}$$

$$J(D) = [\Gamma(5/2)]^{-1} \int_0^\infty \frac{x^{9/2} e^{-x} dx}{x^3 + D} \quad \text{(eqn. 14)}$$

$$D = \frac{N^2 e^4 \lambda^2 \rho_0^2 \Gamma(4) g}{4\pi^2 C^2 m^{*2}} \quad \text{(eqn. 15)}$$

$$L(D) = \frac{N^3 e^{-x} dx}{0 \, x^3 + D} \quad \text{(eqn. 16)}$$

$$g = \frac{\Gamma(4)}{[\Gamma(5/2)]^2} \quad \text{(eqn. 17)}$$

where N is the carrier concentration, $\rho_0$ is the DC resistivity, $\lambda$ is the wavelength in a vacuum, $m^*$ is the conductivity effective mass, e is the charge on an electron, C is the velocity of light, $K_L$ is the dielectric constant of the entrinsic semiconductor at long wavelengths and $\Gamma$ is the gamma function.

The calculations of theoretical spectral reflectance values are performed preferably by forming a table or matrix of m rows by (2q+1) columns, where m is the number of different wavelengths at which the values are determined and q is a number large enough to establish a range of different thicknesses including the one being measured. The thicknesses at which the calculations are made is determined by assuming a central value or nominal thickness and a number q of different successive thicknesses differing by a fixed amount h chosen according to the desired degree of precision and the range of measurement. In a typical system; m=125 wavelengths equally spaced across the IR spectrum of 2.5 to 50 microns; q=5; and h=0.1 micron for d in the range 0.2 to 1.2 microns.

Step 44 involves a correlation analysis in which the measured spectral reflectance values from step 40 are correlated with the theoretical reflectance values of the different epi thicknesses from step 42. This is done by calculating a series of correlation coefficients between the theoretical spectral reflectance values and the measured spectral reflectance values. There will be one correlation coefficient for each of the assumed theoretical thickness values. The correlation step assigns a numerical measure to the degree of linear correlation between the theoretical and measured quantities and in essence provides a quantitative measure of how similar the theoretical and measured quantities are in shape but not in absolute value. The calculations are done in accordance with the following equation:

$$COR_i = \frac{\sum_{j=1}^{m} (CF_{ij} - \overline{CF_i})(R_j - \overline{R})}{\left[ \sum_{j=1}^{m} (CF_{ij} - \overline{CF_i})^2 \cdot \sum_{j=1}^{m} (R_j - \overline{R})^2 \right]^{\frac{1}{2}}} \quad \text{(eqn. 18)}$$

where CF is a matrix of 2q+1 columns of m rows of theoretical spectral reflectance values, $COR_i$ is the correlation coefficient of the i th. column corresponding to the i th. theoretical thickness value, $CF_{ij}$ is the j th. element of the i column, $\overline{CF_i}$ is the arithmetic mean of the values in the i column, R is a vector of m values of measured spectral reflectance, $\overline{R}$ is the arithmetic mean of such value, and $R_j$ is the j element of vector R.

Each correlation coefficient is independent of amplitude differences and can be any value between $-1$ and $+1$. If $COR_i = +1$ or $-1$, respectively, the relation is directly or indirectly linear. If $COR_i = 0$, then there is no relation.

The terms eqn. 1–eqn. 18 are hereby defined to mean the equations Eqn. 1 to Eqn. 18 as set forth above using the various values for the letters and symbols described above. This definition applies to the use of such terms hereinafter in the specification and in the claims.

Figure 7:
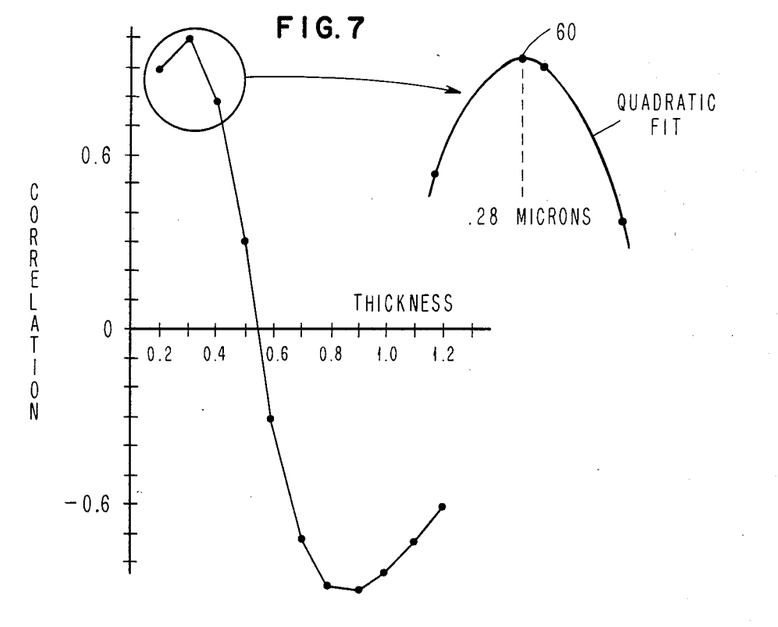
FIG. 7 is a correlation graph derived from the sample from which the graph from FIG. 6 was derived.

Step 46 then determines the epi thickness from the results of the correlation analysis from step 44. This determination is done by curve fitting the correlation coefficients to a quadratic fit, locating the maximum positive peak of the fitted curve, and interpolating the associated thickness values to determine the thickness of the sample. By way of example and with reference to FIG. 7, described in more detail below, the enlarged smooth curve at the right of FIG. 7 represents the quadratic curve fitted around the three greatest positive correlation coefficients. The peak is at point 60 and the correspondiing interpolated value for thickness is 0.28 microns.

Figure 4:
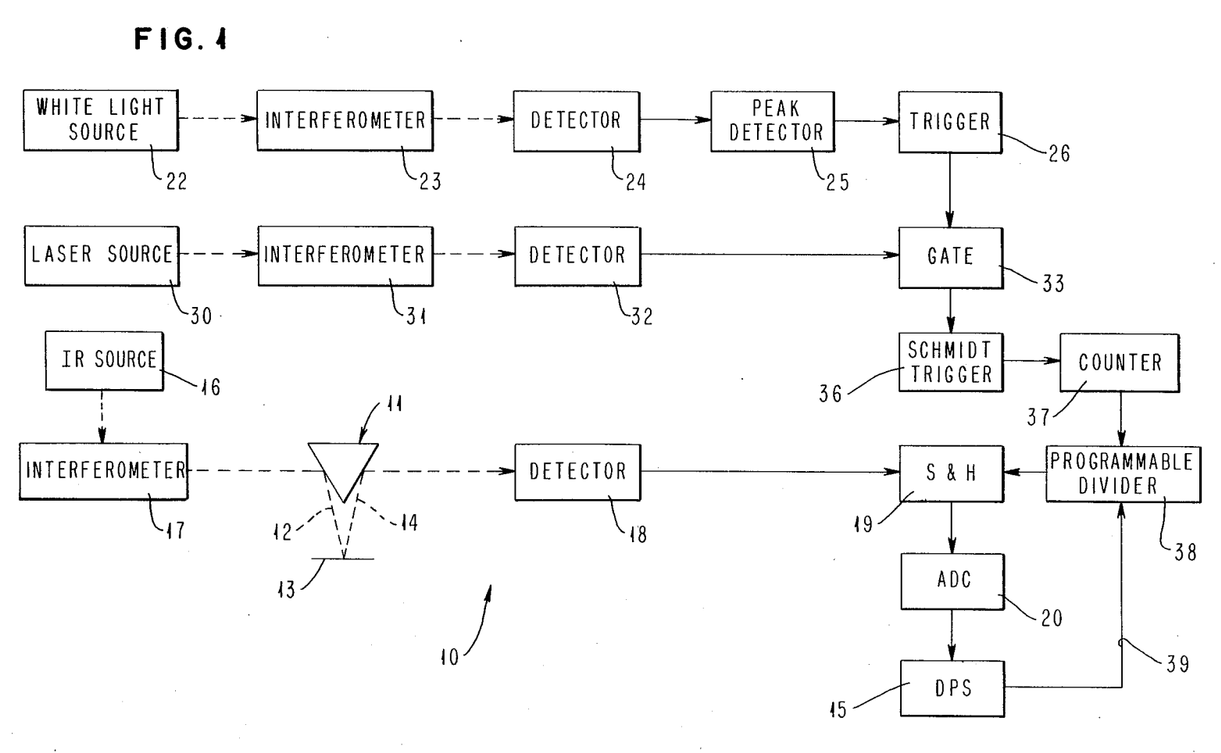
FIG. 4 is a spectral reflectance graph derived from measuring a sample.

Exemplary measurements of two different samples having different epi thicknesses will now be discussed. Both samples are of silicon wafers in which the epi layer carrier concentration is $1 \times 10^{16}$ atoms of arsenic per cc and the substrate concentration is $5 \times 10^{19}$. The epi thickness of the first sample measured or determined by the apparatus and method described above was 0.51 microns. The measured spectral reflectance, determined by step 40, is shown in FIG. 4. These measured values were then correlated against theoretical values, determined by step 42, for epi thicknesses in the range 0.2 to 1.2 microns at eleven equally spaced (0.1 microns) values to produce a correlation vector whose values are plotted and shown in FIG. 5. A quadratic fit was made of the values, the peak of the fit was located resulting in a thickness of 0.51 microns. This result is the measured epic thickness of the first sample.

Figure 5:
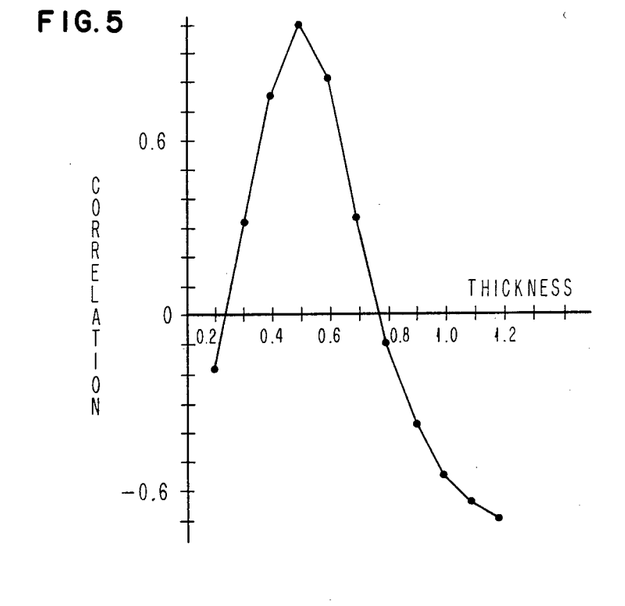
FIG. 5 is a correlation graph derived from the same sample from which the graph of FIG. 4 was derived.
Figure 6:
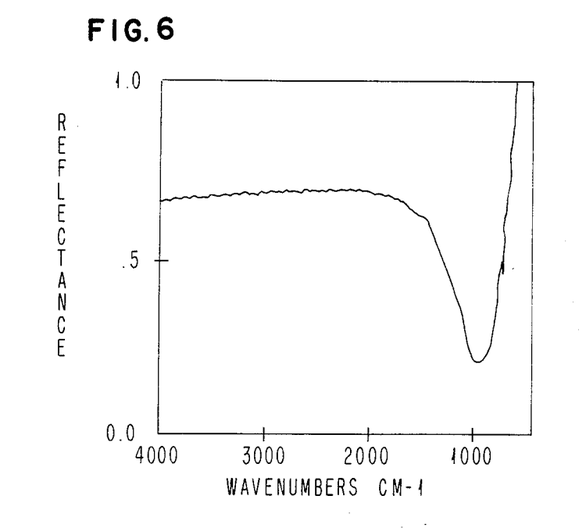
FIG. 6 is a spectral reflectance graph derived from another sample.

FIGS. 6 and 7 are graphs, similar to FIGS. 4 and 5, of the spectral reflectance and correlation of the second sample for which the measured thickness was determined to be 0.28 microns. These two sample measurements are for illustrative purposes only and are not to be considered as limiting. The lower limit or ranges of epi thickness for the invention is less than 0.1 micron and the upper limit is above that value for which semiconductor manufacturers currently have an interest and greater than 35 microns.

It should be noted that the incident beam 12 in FIG. 1 is not normal or perpendicular to the wafer, while the first theory (eqns. 1–17) assumed a normal angle of incidence. This difference results in an error of less than 0.01 microns and can be considered negligible.

The preferred embodiment of the invention involves programming a general purpose computer by storing a program therein so that the computer and stored program constitute the apparatus form of the invention. Such apparatus automatically performs the functions or process described above. The details of the program are not germane to understanding the invention and it is merely a clerical programming skill to translate the method described above, including performing the various mathematical algorithms, into a suitable program.

The invention is also susceptible to many different variations. First, the above description implies creating a single table or matrix encompassing the thickness of a sample. Where samples of greater ranges of thicknesses and doping concentrations are to be measured, several tables or matrices can be created and stored. By known procedures, such tables can be individually accessed during the measurement of a single wafer. This general procedure thus speeds up measuring many wafers particularly in a production environment. Secondly, a slightly different form of the invention was published by the assignee of the invention in the IBM TDB Vol. 24, No. 1A (June 1981), pages 49–54.

Having thus described by invention, what we claim as new, and desire to secure by Letters Patent is:

1. The method of measuring, by means of an instrument connected to a data processing system (DPS), the thickness of a sample epi layer grown on a substrate, comprising the steps of:
    (a) operating said instrument and said DPS to measure the spectral reflectance of IR energy reflected from the surface of the epi layer and from the interface between the epi layer and the substrate;
    (b) storing within said DPS values representing the measured spectral reflectance resulting from step (a);
    (c) storing within said DPS values representing a series of theoretical spectral reflectances determined for a series of epi layers of different thicknesses within a range including the thickness of the epi layer being measured, said series of epi layers being of like doping concentrations;
    (d) correlating within said DPS values for each of said theoretical spectral reflectances with values of said measured spectral reflectance and providing a quantitative measure of the degree of correlation as a function of epi layer thickness;
    and (e) determining within said DPS the thickness of the sample epi layer from the maximum value of said quantitative measure of the degree of correlation.

2. The method of claim 1 wherein said theoretical spectral reflectance values is calculated on the basis of the assumption that the epi layer on the substrate is an absorbing thin layer on an absorbing substrate.

3. The method of claim 2 wherein said theoretical spectral reflectance values are calculated using equations eqn. 1 through eqn. 17.

4. The method of claim 1 wherein step (a) comprises the sub-steps of
    (a1) measuring the intensity of IR energy reflected from the layer and the interface, by means of an interferometer,
    (a2) and Fourier transforming, within said DPS, the measured intensity to produce said spectral reflectance.

5. The method of claim 1 wherein:
    step (d) comprises calculating a series of correlation coefficients as a function of epi thickness;
    and step (e) comprises fitting a quadratic curve to said correlation coefficients and determining the thickness of the sample from the maximum positive peak of said curve.

6. Apparatus for measuring the thickness of a sample epi layer grown on a substrate, comprising:
    measuring means for measuring the spectral reflectance of IR energy reflected from the epi layer and the interface between the epi layer and the substrate;

and data processing means for performing plural functions including storing digital values representing the measured spectral reflectance, storing digital values representing a series of theoretical spectral reflectances determined for a series of epi layers of different thicknesses within a range encompassing the thickness of the sample epi layer, said series of epi layers being of like doping concentration, correlating each theoretical spectral reflectance with said measured spectral reflectance and providing a series of signals representing quantitative measurements of the degree of correlation there between as a function of epi layer thickness, and determining the thickness of the sample epi layer from the maximum value of said quantitative measurement.

7. Apparatus of claim 6 wherein said measuring means comprises:

a Fourier transform IR spectrometer for measuring the intensity of the reflected IR energy and converting such intensity into said spectral reflectance.

8. Apparatus of claim 6 wherein:

said data processing means performs the function of for calculating said theoretical spectral reflectances on the assumption that the epi layer on the substrate forms an absorbing layer on an absorbing substrate.

9. Apparatus of claim 6 wherein said data processing means calculates a series of correlation coefficients, and determines the epi thickness from said correlation coefficients.

10. Apparatus of claim 9 wherein said data processing means calculates said series of correlation coefficients using equation eqn. 18.

11. The method of measuring, by means of an instrument connected to a data processing system (DPS), the thickness of a sample epi layer grown on a substrate, comprising the steps of:

(a) operating said instrument and said DPS to measure the spectral reflectance of IR energy reflected from the surface of the epi layer and from the interface between the epi layer and the substrate;

(b) storing within said DPS values representing the measured spectral reflectance resulting from step (a);

(c) storing within said DPS values representing a series of theoretical spectral reflectances determined for a series of epi layers of different thicknesses within a range including the thickness of the epi layer being measured, said series of epi layers being of like doping concentrations;

(d) correlating within said DPS values of each of said theoretical spectral reflectances with values of said measured spectral reflectance and providing a quantitative measure of the degree of correlation as a function of epi layer thickness, said quantitative measure being calculated using eqn. 18;

and (e) determining within said DPS the thickness of the sample epi layer from the quantitative measure.

12. The method of measuring epi layer thicknesses within a sub-micron range, by means of an instrument connected to a data processing system (DPS), the thickness of a sample epi layer grown on a substrate, comprising the steps of:

(a) operating said instrument and said DPS to measure the spectral reflectance of IR energy reflected from the surface of the epi layer and from the interface between the epi layer and the substrate;

(b) storing within said DPS values representing the measured spectral reflectance resulting from step (a);

(c) storing within said DPS values representing a series of theoretical spectral reflectances determined for a series of epi layers of different thicknesses within a range including the thickness of the epi layer being measured, said series of epi layers being of like doping concentrations;

(d) correlating within said DPS values of each of said theoretical spectral reflectances with values of said measured spectral reflectance and providing a quantitative measure of the degree of correlation as a function of epi layer thickness;

and (e) determining within said DPS the thickness of the sample epi layer from the quantitative measure, said thickness being in a range of thicknesses comprising values from less than 0.1 micron to 1.0 micron.

13. Apparatus for measuring the thickness of a sample epi layer grown on a substrate, comprising:

measuring means for measuring the spectral reflectance of IR energy reflected from the epi layer and the interface between the epi layer and the substrate;

and data processing means for performing plural functions including storing digital values representing the measured spectral reflectance, calculating and storing digital values representing a series of theoretical spectral reflectances determined for a series of epi layers of different thicknesses within a range encompassing the thickness of the sample epi layer, said series of epi layers being of like doping concentration, said calculating being done using equations eqn. 1 through eqn. 17 and using the assumption that the epi layer on the substrate forms an absorbing layer on an absorbing substrate, correlating each theoretical spectral reflectance with said measured spectral reflectance and providing a series of signals representing quantitative measurements of the degree of correlation therebetween as a function of epi layer thickness, and determining the thickness of the sample epi layer from said quantitative measurements.

14. Apparatus for measuring the thickness of a sample epi layer grown on a substrate, comprising:

measuring means for measuring the spectral reflectance of IR energy reflected from the epi layer and the interface between the epi layer and the substrate;

and data processing means operable to determine epi layer thickness over the range from less than 0.1 micron to greater than 35 microns, said data processing means performing plural functions including storing digital values representing the measured spectral reflectance, storing digital values representing a series of theoretical spectral reflectances determined for a series of epi layers of different thicknesses within a range encompassing the thickness of the sample epi layer, said series of epi layers being of like doping concentration, correlating each theoretical spectral reflection with said measured spectral reflectance and providing a series of signals representing quantitative measurements of the degree of correlation therebetween as a function of epi layer thickness, and determining the thickness of the sample epi layer from said quantitative measurements.

* * * * *